(12) United States Patent
Szabo et al.

(10) Patent No.: US 9,509,600 B1
(45) Date of Patent: Nov. 29, 2016

(54) METHODS FOR PROVIDING PER-CONNECTION ROUTING IN A VIRTUAL ENVIRONMENT AND DEVICES THEREOF

(71) Applicant: F5 Networks, Inc., Seattle, WA (US)

(72) Inventors: Paul I. Szabo, Shoreline, WA (US); Daniel Wright, Redmond, WA (US); Dayne Miller, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 17 days.

(21) Appl. No.: 14/452,960

(22) Filed: Aug. 6, 2014

Related U.S. Application Data (60) Provisional application No. 61/862,855, filed on Aug. 6, 2013.

(51) Int. Cl.
  *G06F 15/173* (2006.01)
  *H04L 12/741* (2013.01)
  *G06F 9/455* (2006.01)

(52) U.S. Cl.
  CPC ........... *H04L 45/54* (2013.01); *G06F 9/45533* (2013.01)

(58) Field of Classification Search
  CPC ........................ H04L 41/00; H04L 12/4633
  USPC ........ 709/238, 239, 240, 241, 242; 370/236, 370/254, 401
  See application file for complete search history.

(56) References Cited

U.S. PATENT DOCUMENTS

| | | | |
|---|---|---|---|
| 7,516,217 B2 | 4/2009 | Yodaiken | |
| 9,014,184 B2* | 4/2015 | Iwata | H04L 12/4633 370/389 |
| 2009/0031054 A1* | 1/2009 | Kato | G06F 13/385 710/22 |
| 2012/0246637 A1* | 9/2012 | Kreeger | H04L 45/54 718/1 |
| 2013/0086195 A1* | 4/2013 | Hiniker | H04L 12/2836 709/208 |
| 2014/0207926 A1* | 7/2014 | Benny | H04L 41/0213 709/223 |

OTHER PUBLICATIONS

"VMware Virtual Networking Concepts"—VMWare, Jul. 2007 http://www.vmware.com/content/dam/digitalmarketing/vmware/en/pdf/techpaper/virtual_networking_concepts.pdf.*

* cited by examiner

*Primary Examiner* — Randy Scott
(74) *Attorney, Agent, or Firm* — LeClairRyan, a Professional Corporation (57) ABSTRACT

A method, non-transitory computer readable medium, and host device that receives, at a routing interface, a request from a transmission control protocol (TCP) connection with a stateful network device. A media access control (MAC) address of the stateful network device is determined and the MAC address and the routing interface are stored as associated with information for the TCP connection in a per-connection routing table. The request is sent to one of a plurality of virtual machines, a response is received from the one of the virtual machines, and the MAC address and routing interface are retrieved from the per-connection routing table based on a comparison of information included in the response to the information for the TCP connection. The response is sent to the stateful network device using the retrieved MAC address and routing interface.

21 Claims, 4 Drawing Sheets

METHODS FOR PROVIDING PER-CONNECTION ROUTING IN A VIRTUAL ENVIRONMENT AND DEVICES THEREOF

This application claims the benefit of U.S. Provisional Patent Application No. 61/862,855, filed on Aug. 6, 2013, which is hereby incorporated by reference in its entirety.

FIELD

This technology generally relates to methods and devices for managing network traffic and, more particularly, to providing per-connection routing in a virtual environment to facilitate symmetric routing for stateful network devices.

BACKGROUND

Stateful network devices, such as application delivery controllers, network traffic managers, routers, and firewalls for example, are present in many network environments. As one example, a firewall is a stateful network device that maintains the state of active network connections, such as transmission control protocol (TCP) connections, for example. Firewalls identify and allow the transmission of network communications associated with active network connections and restrict the transmission of network communications that do not match a known active connection in order to increase network security.

Accordingly, firewalls, as well as other stateful network devices, expect both directions of network traffic for a connection and require symmetric routing in order to operate properly and determine which connections are active and for which network communications are permitted. In order to provide symmetric routing, some network devices provide per-connection routing, which is also referred to as auto last hop capability or reverse persistence. Network devices can provide per-connection routing by storing the media access control (MAC) address of the stateful network device, and routing interface from which a request was received, as associated with information for the connection. The connection information can include the source and destination Internet protocol (IP) addresses and/or port numbers included in a header of a request, for example.

Using the stored information, the network device can determine the MAC address and routing interface required to route a response back to the stateful network device from which the corresponding request was received, and thereby provide symmetric routing. Without using the stored information, the network device would use Internet protocol (IP) routing or a default route based on the origin of the request (e.g., a client computing device). Such routing may be asymmetric since there may be a network path to the origin of the request that does not include a stateful network device from which the request was received.

Increasingly, virtualization has been used to optimize performance of various network devices. Using virtualization, a host network device may execute virtual machine(s) managed by a hypervisor, which acts as an intermediary between the virtual machine(s) and the host network device hardware. It may be advantageous in some network environments to have a host network device with a virtual environment including virtual machines running different operating systems which execute application to provide traffic management or application delivery functionality, for example. However, many operating systems do not support per-connection routing. Accordingly, symmetric routing would not be guaranteed in a network environment including a host network device with such a virtual environment, thereby negatively impacting the performance of upstream stateful network devices in the network environment.

SUMMARY

A method for providing per-connection routing in a virtual environment includes receiving, by a host network device and at a routing interface, a request from a transmission control protocol (TCP) connection with a stateful network device. A media access control (MAC) address of the stateful network device is determined by the host network device and the MAC address and the routing interface are stored by the host network device as associated with information for the TCP connection in a per-connection routing table. The request is sent by the host network device to one of a plurality of virtual machines, a response is received by the host network device from the one of the virtual machines, and the MAC address and routing interface are retrieved by the host network device from the per-connection routing table based on a comparison of information included in the response to the information for the TCP connection. The response is sent by the host network device to the stateful network device using the retrieved MAC address and routing interface.

A non-transitory computer readable medium having stored thereon instructions for providing per-connection routing in a virtual environment comprising machine executable code which when executed by a processor, causes the processor to perform steps including receiving, at a routing interface, a request from a transmission control protocol (TCP) connection with a stateful network device. A media access control (MAC) address of the stateful network device is determined and the MAC address and the routing interface are stored as associated with information for the TCP connection in a per-connection routing table. The request is sent to one of a plurality of virtual machines, a response is received from the one of the virtual machines, and the MAC address and routing interface are retrieved from the per-connection routing table based on a comparison of information included in the response to the information for the TCP connection. The response is sent to the stateful network device using the retrieved MAC address and routing interface.

A host network device includes a processor coupled to a memory and configured to be capable of executing programmed instructions stored in the memory, including receiving, at a routing interface, a request from a transmission control protocol (TCP) connection with a stateful network device. A media access control (MAC) address of the stateful network device is determined and the MAC address and the routing interface are stored as associated with information for the TCP connection in a per-connection routing table. The request is sent to one of a plurality of virtual machines, a response is received from the one of the virtual machines, and the MAC address and routing interface are retrieved from the per-connection routing table based on a comparison of information included in the response to the information for the TCP connection. The response is sent to the stateful network device using the retrieved MAC address and routing interface.

This technology provides a number of advantages including methods, non-transitory computer readable media, and devices that provide per-connection routing in a network environment with a network device hosting a virtual environment having virtual machines executing operating systems that do not support per-connection routing. With this technology, a hypervisor of a host network device can override routing decisions made by virtual machine operating systems that do not support per-connection routing. Accordingly, symmetric routing can be provided for stateful network devices in a network environment with such a host network device thereby allowing the stateful network devices to continue operating with expected performance.

DETAILED DESCRIPTION

Figure 1:
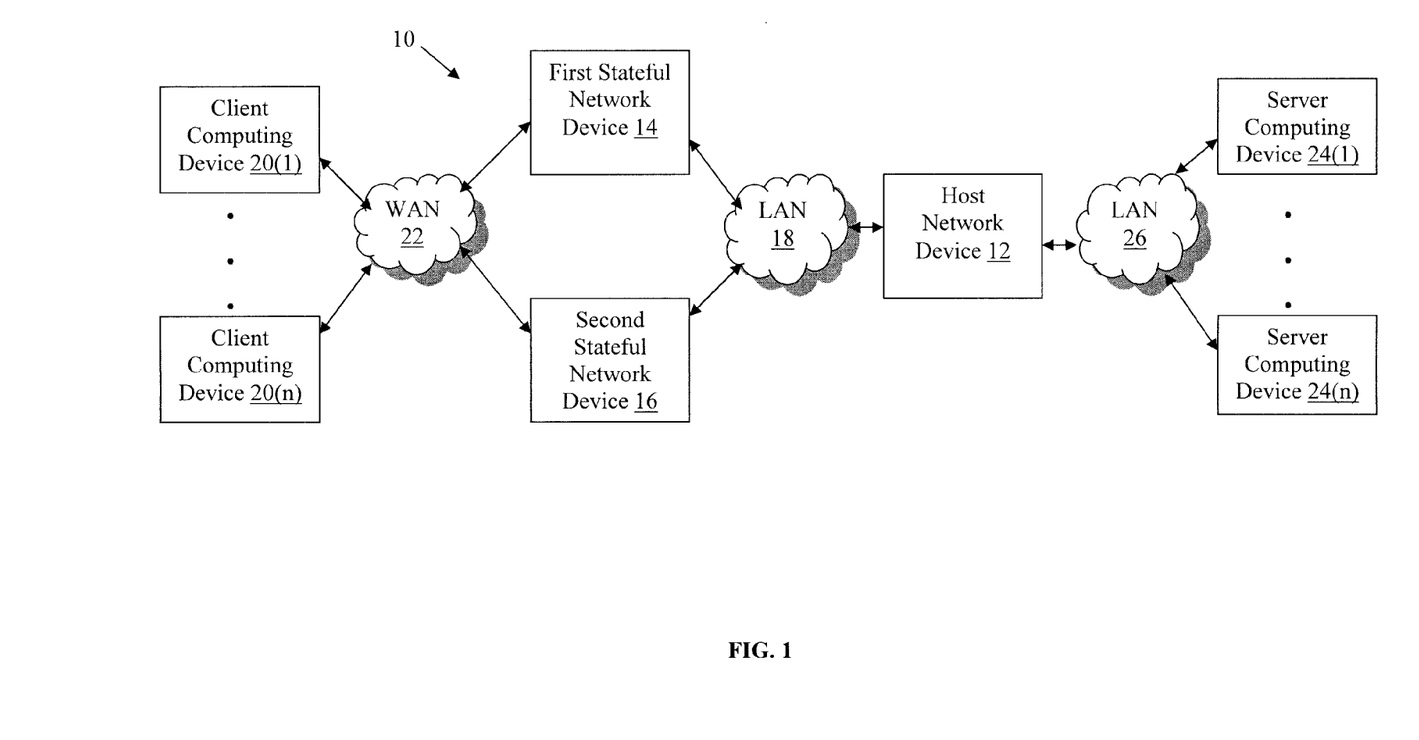
FIG. 1 is a block diagram of a network environment with an exemplary host network device.

Referring to FIG. 1, a network environment 10 which incorporates an exemplary host network device 12 is illustrated. The host network device 12 is coupled to a first stateful network device 14 and a second stateful network device 16 through a local area network (LAN) 18, a plurality of client computing devices 20(1)-20(n) through the LAN 18, the first stateful device 14, and the second stateful network device 16, and a wide area network (WAN) 22, and a plurality of server computing devices 24(1)-24(n) through another LAN 26, although the host network device 12, stateful network devices 14 and 16, client computing devices 20(1)-20(n), and server computing devices 24(1)-24(n) may be coupled together via other topologies and the network environment 10 may include other network devices. This technology provides a number of advantages including methods, non-transitory computer readable media, and devices that improve processing of communications in networks with stateful network devices by providing per-connection routing for, and thereby improving the functioning of, host network devices with virtual environments.

Figure 2:
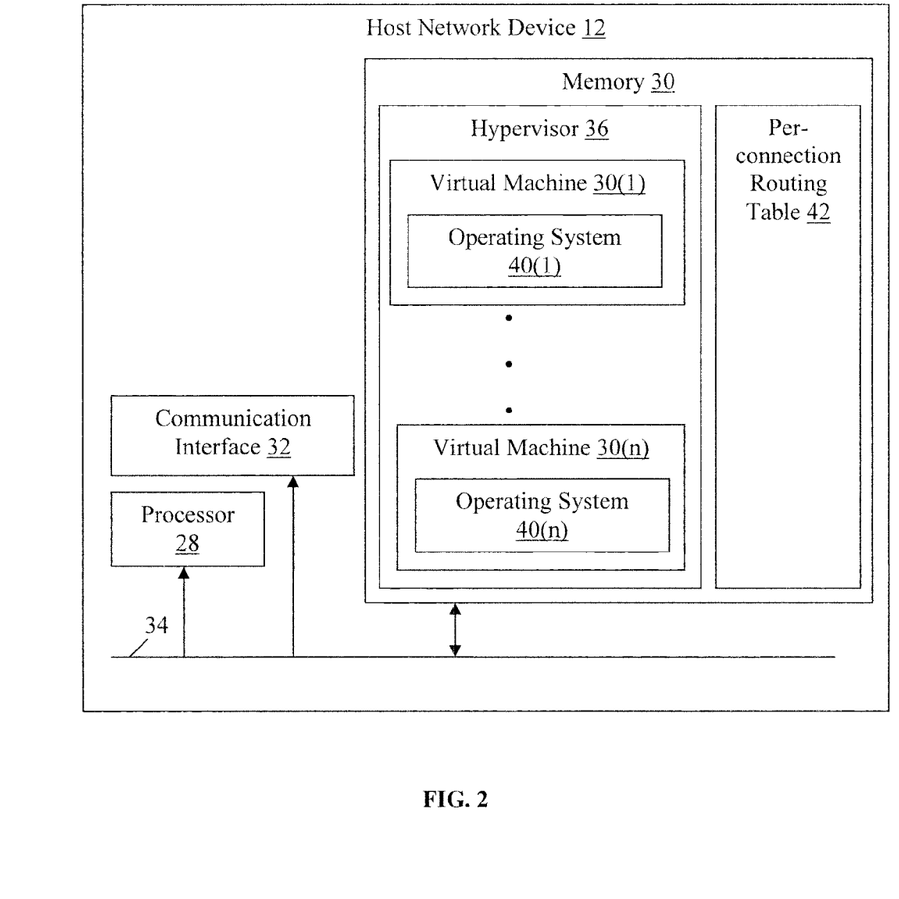
FIG. 2 is a block diagram of the exemplary host network device illustrated in FIG. 1.

Referring to FIGS. 1-2, the host network device 12 may perform any number of functions, such as network traffic management, application delivery, load balancing, or optimizing and/or securing network traffic between the client computing devices 20(1)-20(n) and the server computing devices 24(1)-24(n), for example. In this example, the host network device 12 includes a processor 28, memory 30, and a communication interface 32, which are coupled together by a bus 34 or other communication link, although the host network device 12 may include other types and numbers of elements in other configurations. The processor 28 in the host network device 12 executes a program of stored instructions for one or more aspects of the present technology as described and illustrated by way of the examples herein, although other types and numbers of processing devices and logic could be used and the processor 28 could execute other numbers and types of programmed instructions.

The memory 30 of the host network device 12 stores these programmed instructions for one or more aspects of the present technology, as described and illustrated herein, although some or all of the programmed instructions could be stored elsewhere. In this example, the memory of the host network device 12 stores programmed instructions for a hypervisor 36 which is configured to manage a plurality of virtual machines 38(1)-38(n), each of which is associated with an operating system 40(1)-40(n) configured to execute on a respective one of the virtual machines 38(1)-38(n). Various networking applications can be configured to execute on the operating system 40(1)-40(n) of each of the virtual machines 38(1)-38(n) in order to carry out any number of functions on behalf of the host network device 12, such as those identified earlier.

Additionally, the memory 30 of the host network device 12 stores a per-connection routing table 42 in this example. The per-connection routing table 42 stores connection information and data link layer or physical addresses of upstream stateful network devices, such as the first stateful network device 14 and/or the second stateful network device 16, for example. Accordingly, the per-connection routing table 42 can store a media access control (MAC) address of an originating one of the first stateful network device 14 or the second stateful network device 16, and a routing interface at which a network communication is received, as associated with connection information for the connection through which the network communication was received, as described and illustrated in more detail later.

Additionally, the memory 30 of the host network device 12 can store programmed instructions for networking applications and/or operating system(s) not included in the virtual environment managed by the hypervisor 36. A variety of different types of memory storage devices, such as a random access memory (RAM), read only memory (ROM), flash memory, hard disk, solid state storage, or any other computer readable medium which is read from and written to by a magnetic, optical, or other reading and writing system that is coupled to the processor 28, can be used for the memory 30 in the host network device 12.

The communication interface 32 of the host network device 12 operatively couples and communicates between the host network device 12, first stateful network device 14, second stateful network device 16, client computing devices 20(1)-20(n), and server computing devices 24(1)-24(n), which are all coupled together by the LANs 18 and 26 and WAN 22, although other types and numbers of communication networks or systems with other types and numbers of connections and configurations to other devices and elements can also be used. By way of example only, the LANs 18 and 26 and WAN 22 can use TCP/IP over Ethernet and industry-standard protocols, including NFS, CIFS, SOAP, XML, LDAP, and SNMP, although other types and numbers of communication networks can also be used.

The LANs 18 and 26 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The WAN may comprise any wide area network (e.g., Internet), although any other type of network traffic topology may be used.

The first stateful network device 14 and the second stateful network device 16 can be the same or different devices configured to receive, send, and optionally manage network traffic associated with flows or connections in a stateful manner, although again other numbers of stateful devices could be used. The first stateful network device 14 and/or the second stateful network device 16 can be an application delivery controller, network traffic manager, router, or firewall, for example, or any other network device that relies on symmetric routing in order to function properly. Each of the first stateful network device 14 and the second stateful network device 16 includes at least a processor and/or configurable hardware logic, a memory, and a communication interface, which are coupled together by a bus or other communication link, although other numbers and types of devices could be used.

Each of the client computing devices 20(1)-20(n) in this example includes a processor, a memory, a communication interface, an input device, and a display device, which are coupled together by a bus or other communication link, although other numbers and types of network devices could be used. The client computing devices 20(1)-20(n) may run interface applications that facilitate communication with the server computing devices 24(1)-24(n) via the WAN 22, LANs 18 and 26, the first stateful network device 14 and/or the second stateful network device 16, and the host network device 12. The communications can be requests for resources such as content or applications, for example, hosted by the server computing devices 24(1)-24(n).

Each of the server computing devices 24(1)-24(n) in this example includes a processor, a memory, and a communication interface which are coupled together by a bus or other communication link, although other numbers and types of network devices could be used. The server computing devices 24(1)-24(n) may be hardware or software or may represent a system with multiple server computing devices in a server pool, which may include internal or external networks. Accordingly, additional other types and/or numbers of server computing devices may be present in the network environment 10.

Generally, the server computing devices 24(1)-24(n) process requests received from requesting client computing devices 20(1)-20(n) via the WAN 22, LANs 18 and 26, the first stateful network device 14 and/or the second stateful network device 16, and the host network device 12 according to the HTTP-based application RFC protocol, the CIFS or NFS protocol, a TCP/UDP based protocol, or any protocol that can be used to communicate data. Various network processing applications, such as CIFS applications, NFS applications, HTTP Web Server computing device applications, and/or FTP applications, for example, may be operating on the server computing devices 24(1)-24(n) and transmitting data (e.g., files or Web pages) to the host network device 12 in response to requests from the client computing devices 20(1)-20(n), although any other network processing applications can also be used and many different types of applications may be available on each of the server computing devices 24(1)-24(n).

Although an exemplary network environment 10 with the host network device 12, first stateful network device 14, second stateful network device 16, client computing devices 20(1)-20(n), server computing devices 24(1)-24(n), LANs 18 and 26 and WAN 22 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples.

One or more of the examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 3:
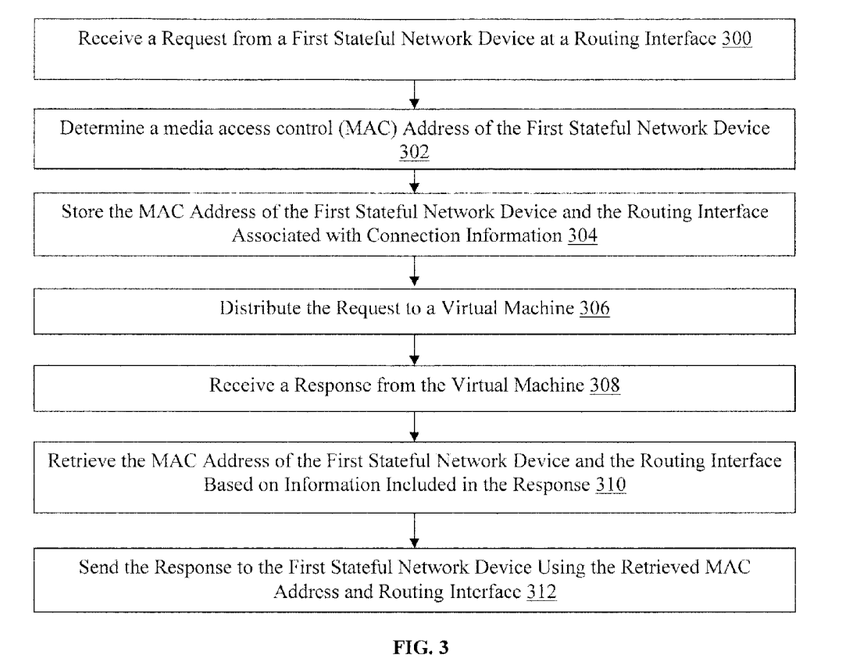
FIG. 3 is a flowchart of an exemplary method for providing per-connection routing in a virtual environment.

An exemplary method for providing per-connection routing in a virtual environment will now be described with reference to FIGS. 1-5. Referring more specifically to FIG. 3, in step 300, the host network device 12 receives a request from the first stateful network device 14 at a routing interface. The routing interface can be a virtual network interface controller (NIC), a physical NIC, a virtual LAN (VLAN), a network bridge, an Internet Protocol (IP) security (IPSec) tunnel, a virtual extensible LAN (VXLAN) tunnel, a network virtualization using Generic Routing Encapsulation (GRE) (NVGRE) tunnel, a Multiprotocol Label Switching (MPLS) tunnel, an IP in IP tunnel, or any other type of tunnel, for example.

The request in this example is sent in response to a request by one of the client computing devices 20(1)-20(n) for content stored by one of the server computing devices 24(1)-24(n). However, the request can be associated with other types of communications originating with the one of the client computing devices 20(1)-20(n) and received by the first stateful network device 14, which is located along a path to the one of the server computing devices 24(1)-24(n), or any other destination network device.

The request can be received by the communication interface 32 of the host computing device 12 and can be a transmission control protocol (TCP) packet sent using a TCP connection between the first stateful network device 14 and the host network device 12, for example. Accordingly, the routing interface can indicate a physical or virtual interface or port used by the TCP connection with the first stateful network device 14. In this example, the first stateful network device 14 is a firewall configured to provide security functionality including restricting network traffic that is not associated with a known active connection and/or may be malicious, for example. However, in other examples, the first stateful network device 14 can be any other device requiring symmetric routing in order to function properly, as described and illustrated earlier.

In step 302, the host network device 12 determines the MAC address of the first stateful network device 14. The host network device 12 can determine the MAC address using Address Resolution Protocol (ARP) in this example, although other discovery processes, protocols, and methods of determining the MAC address of the first stateful network device can also be used. For example, one or more of an OpenFlow protocol, a representational state transfer (REST) application programming interface (API), or a VXLAN multicast can be used to determine the MAC address. The host network device 12 can communicate the request to the hypervisor 36 which communicates with the communication interface 32 of the host network device 12 to determine the MAC address, for example, although the MAC address can be determines in other manners.

In step 304, the host network device 12 stores the MAC address of the first stateful network device 14 and the routing interface at which the request was received. The MAC address and routing interface can be stored in the per-connection routing table 42 in a portion of the memory 30 of the host network device 12 that is accessible to and managed by the hypervisor 36 of the host device 12, for example, although the MAC address and routing interface can also be stored elsewhere.

Figure 4:
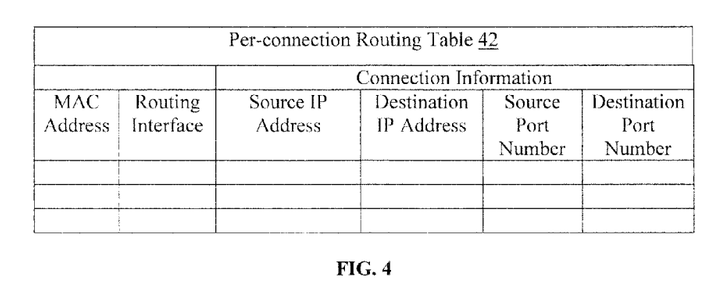
FIG. 4 is an exemplary per-connection routing table.

Referring more specifically to FIG. 4, an exemplary per-connection routing table 42 is illustrated. In this example, the MAC address and routing interface are stored in the per-connection routing table 42 as associated with connection information for the TCP connection in this example, such as the source IP address, destination IP address, source port number, and/or destination port number, for example. The connection information, which is also referred to as a four tuple, can be retrieved from the header of the request received in step 300, for example.

Referring back to FIG. 3, in step 306, the host network device 12, or more specifically the hypervisor executing on the host network device 12 in this example, distributes the request to one of the virtual machines 30(1)-30(n). In one example, the virtual machines 30(1)-30(n) provide equivalent functionality and the hypervisor 36 utilizes a load balancing technique to distribute the request. In other examples, the connection associated with the request is also associated by the hypervisor 36 with one of the virtual machines 30(1)-30(n), an operating system 40(1)-40(n) of one of the virtual machines 30(1)-30(n), and/or an application or thread executed on one of the virtual machines 30(1)-30(n). In these examples, the hypervisor 36 of the host device 12 distributes the request according to associated information regarding the association as previously stored in the memory 30 of the host network device 12, for example. Other methods of, and policies for, distributing the request to the one of the virtual machines 30(1)-30(n) can also be used.

Once distributed in step 306, the request is processed and communicated to another device in the network, such as one of the one of the server computing devices 24(1)-24(n) in this example. The processing can include encrypting, optimizing, accelerating, or load balancing the request, for example, although other types of processing can also be performed by the one of the virtual machines 30(1)-30(n). Once processed, the hypervisor 36 of the host device 12 receives the request from the one of the virtual machines 30(1)-30(n) and sends it to the one of the server computing devices 24(1)-24(n), in this example, using the communication interface 32 of the host device 12.

Accordingly, the one of the server computing devices 24(1)-24(n) in this example will send a response. The response received from the one of the server computing devices 24(1)-24(n) includes the content requested by the one of the client computing devices 20(1)-20(n) in the request received in step 300 in this example, although other information from other types of network devices can also be included in the response. The response from the one of the server computing devices 24(1)-24(n) is received by the communication interface 32 of the host network device 12 and communicated to the hypervisor 36, which distributes it to one of the virtual machines 30(1)-30(n) based on stored information and/or a stored policy.

The one of the virtual machines 30(1)-30(n) to which the response is distributed is the same one of the virtual machines 30(1)-30(n) that processed the request in this example, although in other examples one of the virtual machines 30(1)-30(n) to which the response is distributed can be a different one of the virtual machines 30(1)-30(n). Accordingly, the one of the virtual machines 30(1)-30(n) processes the response received from the one of the server computing devices 24(1)-24(n) in order to prepare the response for eventual transmission to the one of the client computing devices 20(1)-20(n) that originated the request received in step 300.

In step 308, the host network device 12 or more specifically the hypervisor 36 of the host network device 12 receives the processed response from the one of the virtual machines 30(1)-30(n). In this example, the operating system of the one of the virtual machines 30(1)-30(n) does not support per-connection routing. Accordingly, the response received from the one of the virtual machines 30(1)-30(n) will include destination information resulting from a route lookup by one of the operating systems 40(1)-40(n) executing on the one of the virtual machines 30(1)-30(n).

The one of the operating systems 40(1)-40(n) will perform the route lookup using the origin of the corresponding request (the one of the client computing devices 20(1)-20(n) in this example) and a routing table managed by the one of the operating systems 40(1)-40(n) or a default route stored by the one of the operating systems 40(1)-40(n), for example. Accordingly, in this example, the routing information could identify the second stateful network device 16 and would not guarantee symmetric routing of the response back to the first stateful network device 14 from which the corresponding request was received by the host network device in step 300

In step 310, the host network device 12 retrieves a MAC address and a routing interface associated with the TCP connection from which the corresponding request was received by the communication interface 32 of the host device 12. In this example, the hypervisor 36 of the host network device 12 queries the per-connection routing table 42 using information included in the header of the response, such as the source and/or destination IP addresses and/or port numbers. Accordingly, the MAC address and routing interface is retrieved by the host network device 12 based on a comparison of information included in the header of the response with connection information for the TCP connection. In this example, the retrieved MAC address is associated with the first stateful network device 14, as determined and stored in steps 302 and 304, respectively, as described and illustrated in more detail earlier.

In step 312, the host network device 12 sends the response to the first stateful network device 14 based on the MAC address and routing interface retrieved in step 310. The hypervisor 36 of the host network device 12 communicates with the communication interface of the host network device 12 in this example to send the response to the first stateful network device 14 from which the request was received, instead of a network device identified by a routing decision of the one of the operating systems 40(1)-40(n) of the one of the virtual machines 30(1)-30(n). Accordingly, the routing decision of the one of the operating systems 40(1)-40(n) of the one of the virtual machines 30(1)-30(n) is effectively ignored by the host network device 12 in order to guarantee symmetric routing of response. Additionally, in examples in which the routing interface is a tunnel, the host network device 12 encapsulates the response for transmission using the tunnel.

Figure 5:
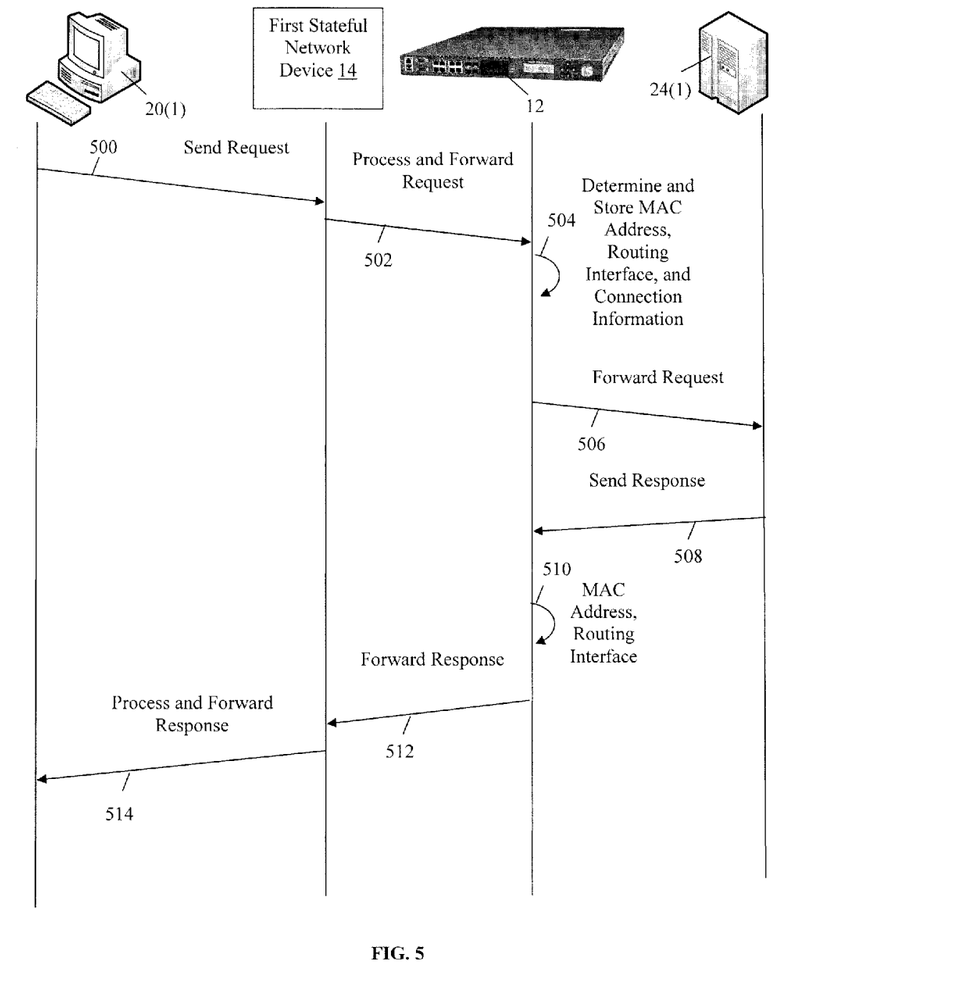
FIG. 5 is a timing diagram of an exemplary method for providing per-connection routing in a virtual environment.

Referring more specifically to FIG. 5, a timing diagram of an exemplary method for providing per-connection routing in a virtual environment is illustrated. In step 500 in this example, the client computing device 20(1) sends a request. The request can be an HTTP request for content hosted by the server computing device 24(1), for example. However, the first stateful network device 14 is located between the client computing device 20(1) and the server computing device 24(1) in this example and receives the request.

In step 502, the first stateful network device 14 processes the request and forwards the request to the host network device 12. The processing can be determining whether to allow the request in an example in which the first stateful network device 14 is a network device implementing a firewall, for example.

In step 504, the host network device 12 receives the request at a routing interface and determines and stores the MAC address of the first stateful network device 14 and the routing interface as associated with connection information obtained from headers of the request, for example. The MAC address and routing interface can be stored in the per-connection routing table 42 as associated with the connection information. The host network device 12 can send the request to one of the virtual machines 30(1)-30(n) which processes the request, as described and illustrated in more detail earlier.

In step 506, the one of the virtual machines 30(1)-30(n) of the host device 12 in this example forwards the request to the server computing device 24(1). In step 508, the server computing device 24(1) sends a response back to the host network device 12. The response can include the content requested by the client computing device 20(1) in the request, for example.

In step 510, the host network device 12 retrieves the MAC address of the first stateful network device and a routing interface at which the request was received using information included in headers of the response, for example, and matching connection information stored in the per-connection routing table 42. The host network device then sends the responses to one of the virtual machines 30(1)-30(n), such as optionally the one of the virtual machines 30(1)-30(n) to which the corresponding request was distributed.

In step 512, the host network device 12 forwards the response to the first stateful network device 14 using the retrieved MAC address and routing interface. Accordingly, the symmetric routing is provided for the first stateful network device 14 which in this example receives network communications in both directions for the connection. In step 514, the first stateful network device 14 processes and forwards the response to the client computing device 20(1).

Accordingly, by this technology, a host network device can include a virtual environment with virtual machines on which operating systems are executed. Some or all of the operating systems do not have to support per-connection routing in order for the host network device to provide symmetric routing for upstream stateful network devices. Instead, a hypervisor of the host network device maintains a per-connection routing table to route responses according to the MAC address and routing interface from which a corresponding request for the connection was received. Thereby, the hypervisor overrides routing decisions made by the operating systems of the virtual machines and advantageously allows the host network device to provide symmetric routing for responses.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for providing per-connection routing in a virtual environment, the method comprising:
   receiving, by a host network device and at a routing interface, a request for a resource from a server computing device, the request received from a transmission control protocol (TCP) connection with a stateful network device;
   determining, by the host network device, a media access control (MAC) address of the stateful network device and storing the MAC address and the routing interface as associated with information for the TCP connection in a per-connection routing table;
   retrieving, by the host network device, the MAC address and routing interface from the per-connection routing table based on a comparison of information included in a response, to the request for the resource from the server computing device previously received from the TCP connection with the stateful network device, received from one of a plurality of virtual machines to the information for the TCP connection; and
   sending, by the host network device, the response to the stateful network device using the retrieved MAC address and routing interface.

2. The method as set forth in claim 1, wherein each of the determining and retrieving is performed by a hypervisor executing on the host network device and configured to manage the virtual machines.

3. The method as set forth in claim 1, wherein each of the virtual machines is configured to perform at least one of an application delivery, a load balancing, or a network traffic management function.

4. The method as set forth in claim 1, wherein the MAC address of the stateful network device is determined using an Address Resolution Protocol (ARP), an OpenFlow protocol, a representational state transfer (REST) application programming interface (API), or a virtual extensible local area network (LAN) (VXLAN) multicast.

5. The method as set forth in claim 1, wherein an operating system of the one of the virtual machines is not configured to provide per-connection routing.

6. The method as set forth in claim 1, wherein the information for the TCP connection or the information included in the response comprises one or more of a source IP address, a source port, a destination IP address, or a destination port.

7. The method as set forth in claim 1, wherein the routing interface is a virtual network interface controller (NIC), a physical NIC, a virtual local area network (LAN) (VLAN), a network bridge or a tunnel selected from an Internet Protocol (IP) security (IPSec) tunnel, a virtual extensible LAN (VXLAN) tunnel, a network virtualization using Generic Routing Encapsulation (GRE) (NVGRE) tunnel, a Multiprotocol Label Switching (MPLS) tunnel, or an IP in IP tunnel.

8. A non-transitory computer readable medium having stored thereon instructions for providing per-connection routing in a virtual environment comprising machine executable code which when executed by a processor, causes the processor to perform steps comprising:
   receiving, at a routing interface, a request for a resource from a server computing device, the request received from a transmission control protocol (TCP) connection with a stateful network device;

determining a media access control (MAC) address of the stateful network device and storing the MAC address and the routing interface as associated with information for the TCP connection in a per-connection routing table;

retrieving the MAC address and routing interface from the per-connection routing table based on a comparison of information included in a response, to the request for the resource from the server computing device previously received from the TCP connection with the stateful network device, received from one of a plurality of virtual machines to the information for the TCP connection; and sending the response to the stateful network device using the retrieved MAC address and routing interface.

9. The medium as set forth in claim 8, wherein each of the determining and retrieving is performed by a hypervisor configured to manage the virtual machines.

10. The medium as set forth in claim 8, wherein each of the virtual machines is configured to perform at least one of an application delivery, a load balancing, or a network traffic management function.

11. The medium as set forth in claim 8, wherein the MAC address of the stateful network device is determined using an Address Resolution Protocol (ARP), an OpenFlow protocol, a representational state transfer (REST) application programming interface (API), or a virtual extensible local area network (LAN) (VXLAN) multicast.

12. The medium as set forth in claim 8, wherein an operating system of the one of the virtual machines is not configured to provide per-connection routing.

13. The medium as set forth in claim 8, wherein the information for the TCP connection or the information included in the response comprises one or more of a source IP address, a source port, a destination IP address, or a destination port.

14. The medium as set forth in claim 8, wherein the routing interface is a virtual network interface controller (NIC), a physical NIC, a virtual local area network (LAN) (VLAN), a network bridge or a tunnel selected from an Internet Protocol (IP) security (IPSec) tunnel, a virtual extensible LAN (VXLAN) tunnel, a network virtualization using Generic Routing Encapsulation (GRE) (NVGRE) tunnel, a Multiprotocol Label Switching (MPLS) tunnel, or an IP in IP tunnel.

15. A host network device, comprising:
a memory comprising programmed instructions stored in the memory and a processor coupled to the memory and configured to be capable of executing the programmed instructions to:

receive, at a routing interface, a request for a resource from a server computing device, the request received from a transmission control protocol (TCP) connection with a stateful network device;

determine a media access control (MAC) address of the stateful network device and storing the MAC address and the routing interface as associated with information for the TCP connection in a per-connection routing table;

retrieve the MAC address and routing interface from the per-connection routing table based on a comparison of information included in a response, to the request for the resource from the server computing device previously received from the TCP connection with the stateful network device, received from one of a plurality of virtual machines to the information for the TCP connection; and send the response to the stateful network device using the retrieved MAC address and routing interface.

16. The device as set forth in claim 15, wherein each of the determining and retrieving is performed by a hypervisor executing on the host network device and configured to manage the virtual machines.

17. The device as set forth in claim 15, wherein each of the virtual machines is configured to perform at least one of an application delivery, a load balancing, or a network traffic management function.

18. The device as set forth in claim 15, wherein the MAC address of the stateful network device is determined using an Address Resolution Protocol (ARP), an OpenFlow protocol, a representational state transfer (REST) application programming interface (API), or a virtual extensible local area network (LAN) (VXLAN) multicast.

19. The device as set forth in claim 15, wherein an operating system of the one of the virtual machines is not configured to provide per-connection routing.

20. The device as set forth in claim 15, wherein the information for the TCP connection or the information included in the response comprises one or more of a source IP address, a source port, a destination IP address, or a destination port.

21. The device as set forth in claim 15, wherein the routing interface is a virtual network interface controller (NIC), a physical NIC, a virtual local area network (LAN) (VLAN), a network bridge or a tunnel selected from an Internet Protocol (IP) security (IPSec) tunnel, a virtual extensible LAN (VXLAN) tunnel, a network virtualization using Generic Routing Encapsulation (GRE) (NVGRE) tunnel, a Multiprotocol Label Switching (MPLS) tunnel, or an IP in IP tunnel.

* * * * *